US012577156B2

(12) United States Patent
Weihrauch et al.

(10) Patent No.: US 12,577,156 B2
(45) Date of Patent: Mar. 17, 2026

(54) METHOD OF PRODUCING CEMENT CLINKER AND A SECOND CALCINED MATERIAL

(71) Applicant: Amrize Technology Switzerland LLC, Zug (CH)

(72) Inventors: Michael Weihrauch, Holderbank (CH); Ernst Bucher, Holderbank (CH); Andreas Spuler, Holderbank (CH); Peter Kruspan, Holderbank (CH); Rudy Blum, Holderbank (CH)

(73) Assignee: Amrize Technology Switzerland LLC, Zug (CH)

( * ) Notice: Subject to any disclaimer, the term of this patent is extended or adjusted under 35 U.S.C. 154(b) by 754 days.

(21) Appl. No.: 17/781,634

(22) PCT Filed: Dec. 18, 2020

(86) PCT No.: PCT/IB2020/062201
§ 371 (c)(1),
(2) Date: Jun. 1, 2022

(87) PCT Pub. No.: WO2021/124261
PCT Pub. Date: Jun. 24, 2021

(65) Prior Publication Data
US 2023/0002277 A1 Jan. 5, 2023

(30) Foreign Application Priority Data

Dec. 18, 2019 (EP) ..................................... 19020705

(51) Int. Cl.
*C04B 7/47* (2006.01)
*C04B 7/43* (2006.01)
(Continued)

(52) U.S. Cl.
CPC .............. *C04B 7/475* (2013.01); *C04B 7/432* (2013.01); *C04B 7/44* (2013.01); *C04B 7/522* (2013.01);
(Continued)

(58) Field of Classification Search
CPC ........... C04B 7/475; C04B 7/432; C04B 7/44; C04B 7/522; C04B 2290/20; C04B 7/246;
(Continued)

(56) References Cited

U.S. PATENT DOCUMENTS 2,946,572 A 7/1960 Annis

FOREIGN PATENT DOCUMENTS

DE 34 11 144 A1 10/1985
DE 10 2011 014498 B4 9/2012
(Continued)

OTHER PUBLICATIONS

Metso, "Kiln burner upgrades", < https://www.metso.com/ portfolio/ kiln-burner-upgrades/>.*
(Continued)

*Primary Examiner* — Amber R Orlando
*Assistant Examiner* — Sarah Catherine Case
(74) *Attorney, Agent, or Firm* — Osha Bergman Watanabe & Burton LLP

(57) ABSTRACT

A method of producing cement clinker and a second calcined material, wherein the cement clinker is produced in a first production line and the second calcined material is produced from a raw material in a second production line by carrying out the following procedures e) optionally drying the raw material in a dryer, g) calcining the optionally dried raw material in a rotary kiln to obtain the second calcined material, wherein the sensible heat of a hot gas in the first production line is used as a heat source in the calcining step g) for calcining the raw material, and wherein the rotary kiln
(Continued)

exhaust gas coming from the calcining step g) is introduced into the first production line for the secondary combustion of the rotary kiln exhaust gas.

19 Claims, 1 Drawing Sheet

(51) Int. Cl.

| | |
|---|---|
| *C04B 7/44* | (2006.01) |
| *C04B 7/52* | (2006.01) |
| *F27B 7/20* | (2006.01) |
| *F27D 17/10* | (2025.01) |
| *F27D 3/08* | (2006.01) |
| *F27D 9/00* | (2006.01) |
| *F27D 13/00* | (2006.01) |

(52) U.S. Cl.
CPC ............ *F27B 7/2016* (2013.01); *F27D 17/10* (2025.01); *F27D 3/08* (2013.01); *F27D 2009/007* (2013.01); *F27D 2013/007* (2013.01)

(58) Field of Classification Search
CPC .. C04B 7/26; C04B 7/28; C04B 28/04; C04B 7/13; F27B 7/2016; F27B 7/00; F27B 19/04; F27D 17/10; F27D 3/08; F27D 2009/007; F27D 2013/007; H10F 30/2218; Y02W 30/91
See application file for complete search history.

(56) References Cited

FOREIGN PATENT DOCUMENTS

| | | | | | |
|---|---|---|---|---|---|
| GB | 2396400 | A | * | 6/2004 | ............... C04B 7/43 |
| WO | WO 2012/025852 | A1 | | 3/2012 | |
| WO | WO 2013/061127 | A2 | | 5/2013 | |
| WO | WO-2019142387 | A1 | * | 7/2019 | ............. C02F 11/06 |

OTHER PUBLICATIONS

Machine Translation of WO-2019142387-A1 (Year: 2019).*
International Search Report as issued in International Patent Application No. PCT/IB2020/062201, dated Mar. 22, 2021.

* cited by examiner

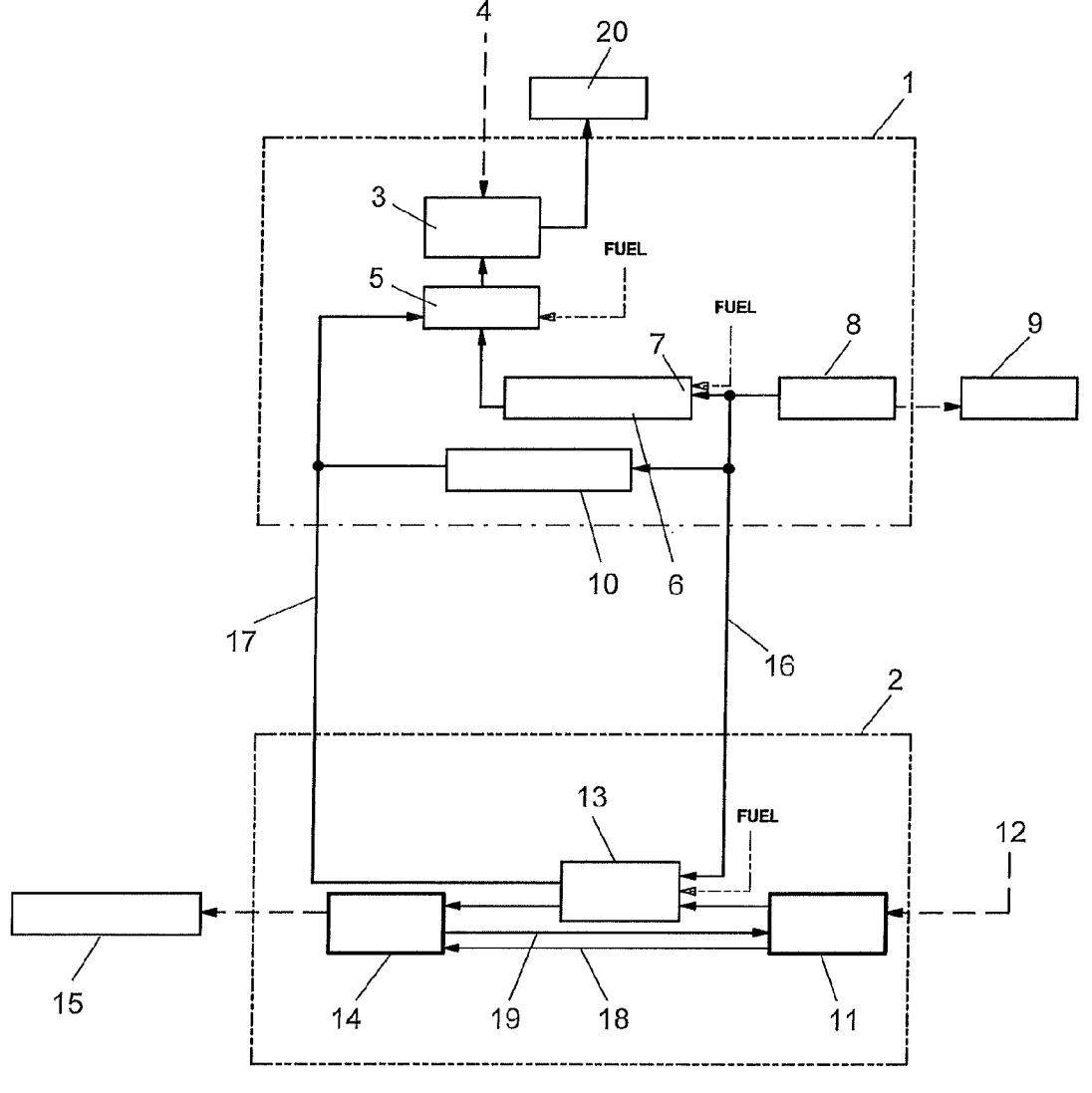

METHOD OF PRODUCING CEMENT CLINKER AND A SECOND CALCINED MATERIAL

CROSS-REFERENCE TO RELATED APPLICATIONS

This application is the U.S. National Stage of International Application Serial No. PCT/IB2020/062201, filed Dec. 18, 2020, which in turn claims priority to European Application No. 19020705.0, filed Dec. 18, 2019. The contents of all of these applications are incorporated herein by reference in their entirety.

The invention refers to a method and a system for producing a first calcined material, which is cement clinker, and a second calcined material, such as a material having pozzolanic and/or latent hydraulic properties.

Various types of mineral components may be added to Portland cement in order to obtain composite cements. In particular, the use of pozzolanic and/or latent hydraulic material ("supplementary cementitious material") as additions to Portland cement concrete mixtures has become common practice.

By substituting pozzolans and/or latent hydraulic materials for Portland cement the specific emission of $CO_2$ in the production of cement will be reduced. During the production of Portland cement clinker about 0.9 tons of $CO_2$ per ton of Portland cement clinker are emitted by the calcination of the raw materials and from the oxidation of the fuels in the rotary tubular kiln.

Pozzolans are a broad class of siliceous or siliceous and aluminous materials which, in finely divided form and in the presence of water, chemically react with calcium hydroxide at ordinary temperature to form compounds possessing cementitious properties. Pozzolans may also be referred to as latent hydraulic material. However, depending on the definition of pozzolanic material, some latent hydraulic material may not fall under the definition of a pozzolanic material. Examples of pozzolanic and/or latent hydraulic materials include granulated blast-furnace slag (gbfs), fly ash, natural pozzolans, burnt oil shale, or calcined clay.

Cement is a product that in most cases is used in locations relatively close to where it is manufactured. Therefore, in case of composite cements, its production requires the availability of a source of a pozzolanic and/or latent hydraulic material, this source being either natural or synthetic. However, the local availability of such source is not guaranteed in all regions where cement is produced, mainly because of the decreasing availability of some synthetic sources of pozzolanic and/or latent hydraulic material. Synthetic pozzolanic and/or latent hydraulic materials are in most cases a by-product of various industrial processes, such as fly ash from coal-fired power plants or blast-furnace slag from steel mills.

Clay minerals are hydrous aluminum silicates, that occur as a contaminant in various materials, for example in quarried aggregate and in excavated materials where its presence may be undesirable. The removal of the clay may be difficult or may give rise to waste products which require long term storage. Clay may be removed from quarried aggregate by washing. However, the resulting aqueous suspension may be difficult to filter in order to obtain a reasonably dry filtered product which can be handled mechanically. When filtration is difficult, the filter cake produced may still contain a substantial proportion of water.

It would be desirable to produce calcined clay on basis of clay from waste products. More generally, it would be desirable to produce various types of synthetic pozzolans and/or latent hydraulic materials on basis of waste products.

Therefore, it is an object of the invention to provide a method and system for producing cement clinker and a second calcined material, such as a material having pozzolanic and/or latent hydraulic properties, wherein the latter may be produced from various waste products, including waste products that contain a substantial proportion of water. Further, it is an object of the invention to recycle waste products in an ecologically friendly way and to reduce the $CO_2$ footprint of composite cements.

In order to solve these objectives, the invention provides a method of producing a first calcined material, which is cement clinker, and a second calcined material, such as a material having pozzolanic and/or latent hydraulic properties, wherein the cement clinker is produced in a first production line by carrying out the following steps:

a) preheating raw meal in a preheater in counter current flow to hot exhaust gases coming from a clinker furnace, b) optionally pre-calcining the preheated raw meal in a pre-calciner, c) calcining the preheated and optionally pre-calcined raw meal in the clinker furnace in counter current flow to combustion gases of a clinker furnace burner to obtain cement clinker, d) optionally cooling the cement clinker in a clinker cooler, wherein the second calcined material is produced from a raw material in a second production line by carrying out the following steps:

e) optionally drying the raw material in a dryer, f) optionally crushing the optionally dried raw material in a crusher, g) calcining the optionally dried and optionally crushed raw material in a rotary kiln to obtain the second calcined material, h) optionally cooling the second calcined material in a cooler, wherein the sensible heat of a hot gas in the first production line is used as a heat source in the calcining step g) for calcining the raw material, and wherein the rotary kiln exhaust gas coming from the calcining step g) is introduced into the first production line for the secondary combustion of the rotary kiln exhaust gas.

The invention is based on the idea to combine two production lines so as to allow recycling certain waste products in an ecologically friendly way. In the first production line, Portland cement clinker is produced in a conventional way by preheating raw meal, optionally pre-calcining the preheated raw meal and subsequently calcining the preheated and optionally pre-calcined raw meal in the clinker furnace. Usually, the clinker furnace is a rotary kiln. The second calcined material, in particular a material having pozzolanic and/or latent hydraulic properties, is produced in a second production line that is arranged at the same production site as the first production line. The second production line comprises a rotary kiln for calcining a raw material, such as a clay containing raw material. The calcination of clay in a rotary kiln is known per se, e.g. from DE 102011014498 B4. In order to be able to process raw material having a high proportion of water, the invention optionally provides for a drying step prior to the calcination step.

The cement clinker produced in the first production line and the second calcined material produced in the second production line may be mixed in suitable proportions in order to obtain a composite cement. For example, the clinker and the second calcined material may be fed to a mill for grinding both components to the desired product fineness. Alternatively, the clinker and the second calcined material may be ground separately and subsequently mixed in suitable proportions in order to obtain a composite cement.

According to the invention, synergies are exploited between the two production lines, in order to increase the energy efficiency and in order to reduce the environmental impact.

According to a first aspect of said synergies, the sensible heat of a hot gas in the first production line is used as a heat source in the calcining step g) for calcining the raw material, so that the external energy input for calcining the raw material may be reduced significantly.

The transfer of sensible heat from the first production line to the second production line may be carried out in various ways. For example, a heat transfer medium may be used that is flowing from the first production line to the second production line. The heat transfer medium may be circulating between the first production line and the second production line. In particular, the heat transfer medium may be a fluid or a gas, that is heated in a heat exchanger that is associated with the first production line and in which the heat transfer medium is in heat exchange with a hot gas from the first production line. The heat transfer medium is transported to the second production line via a tubing and may then be fed through a heat exchanger associated with the second production line for giving off heat to the calcining step. If the heat transfer medium is circulating between the first production line and the second production line, the heat transfer medium, after having transferred its heat to the second production line, is returned to the first production line to be reheated in heat exchange with sensible heat from the first production line.

Preferably, the heat transfer medium is a hot gas taken from the first production line. The heat transfer medium may be extracted from the clinker furnace hood, from the clinker cooler and/or from the preheater exhaust or any other suitable location in the clinker manufacturing process. In this case, a partial amount of the hot gas, in particular the clinker cooler off-gas from the clinker cooler, is branched off and used as said heat source in the calcining step g) for calcining the raw material in the second production line. In this embodiment, a heat exchanger may not be needed. The hot gas taken from the first production line, in particular the cooler off-gas from the clinker cooler, may directly be introduced into the calcining step g), i.e. into the rotary kiln of the second production line.

Alternatively, the sensible heat of a hot gas in the first production line may be used as a heat source in the drying step e) for drying the raw material. In particular, a hot gas taken from the first production line, in particular the cooler off-gas, may be introduced into the dryer or into a heat exchanger associated with the dryer in order to use the sensible heat of said hot gas for drying the raw material in the dryer. In this way, the sensible heat coming from the first production line is also used, indirectly, as a heat source in the calcining step g) for calcining the raw material.

According to a second aspect of said synergies, the rotary kiln exhaust gas coming from the calcining step g) is introduced into the first production line for the secondary combustion of the rotary kiln exhaust gas. In this way contaminants contained in the exhaust gas of the calcining step may be thermally decomposed or may be integrated into the solid material (raw meal, clinker) present in the first production line, thereby preventing the contaminants from escaping into the environment via the exhaust gas.

Preferably, the rotary kiln exhaust gas is introduced into the pre-calciner or the preheater of the first production line.

As mentioned before, various types of sources may be used to produce the synthetic material having pozzolanic and/or latent hydraulic properties. Preferably, the raw material is selected from sludges resulting from the washing of sand or aggregates, asphalt, (waste) gypsum, contaminated earth, wet fly ash, other waste or demolition materials, such as plasterboards for the production of gypsum, road cleaning sludges, filter cakes from the treatment processes of soil and waste washing, and combinations thereof. The drying step would be adapted or not used if the source initially has a low free water content.

In order to reduce the water content of the raw material in a sufficient manner for an energy efficient calcination, the raw material is preferably dried in said drying step e) for reducing the amount of free water to <20 wt.-%, preferably <10 wt.-%, even more preferably <5 wt.-%. The free water content is determined by heating the raw material to a temperature of 105° C. in order to evaporate water until the weight of the raw material does not vary by more than 0.01%, i.e. until mass balance is achieved.

Preferably, a drying screw is used for drying the raw material in the drying step e). A drying screw separates the liquids from the solids, and is heated via a circuit of a heat exchanger fluid, such as oil and/or water, which does not get into contact with the raw material. The heat exchanger fluid is preferably circulating within the shaft and the flyers of the screw and/or the body of the screw. The water and other volatile elements separated inside the drying screw may preferably be filtered and/or condensed, or released in the atmosphere, if they for example present neither any health nor environmental risks.

By separating excess water and volatile elements from the raw material, the thermal energy consumption for the thermal treatment process can be significantly reduced and the impact on the clinker production is minimized.

The raw material can optionally be crushed before being calcined in the rotary kiln. For example, the raw material may be crushed to a particle size of <30 mm. The crushing step may be performed during the drying step or subsequent to the drying step.

The cooler of the second production line can also be designed as a screw conveyor, that is cooled via a circuit of a heat exchanger fluid, such as oil and/or water, which does not get into contact with the second calcined material. The heat exchanger fluid is preferably circulating within the shaft and the flyers of the screw and/or the body of the screw.

In order to recover the thermal energy that is withdrawn from the second calcined material in the cooling step h), the dryer and the cooler of the second production line are preferably operated in a heat exchanging relationship so that the sensible heat drawn from the second calcined material during the cooling step h) is used as a heat source for drying the raw material in the drying step e).

Further, the dryer and the cooler of the second production line are preferably operated in a heat exchanging relationship so that the loss of sensible heat to the raw material during the drying step e) is used as a cooling source for cooling the second calcined material in the cooling step h).

The heat exchanging relationship between the cooler and the dryer of the second production line may be realized by means of a stream of heat exchanger fluid. For example, the hot heater exchanger fluid exiting the cooler may be directly used as a heat exchanger fluid in the dryer, and the cool heater exchanger fluid exiting the dryer may be directly used as a heat exchanger fluid in the cooler. In this way, a closed circuit of heat exchanger fluid may be realized, that does not get into contact neither with the second calcined material nor with the raw material, but exchanges heat via heat exchanger surfaces that separate the flow of heat exchanger fluid from the second calcined material and the raw material, respectively.

The water separated from the raw material in the form of water vapor in the dryer and its thermal energy may be reused within the process of the invention or may be used for external purposes. For example, the vapor can be condensed, whereby the water resulting from the condensation may be used to cool the clinker or the cement kiln dust within the first production line. Preferably, the vapor may be condensed by heat exchange with a heat exchanger fluid, such as water. The heated heat exchanger fluid may for example be used for district heating.

The rotary kiln is preferably operated at a temperature of about 400-1000° C. using sensible heat derived from the first production line. The sensible heat obtained from the first production line may be the only source of heat for calcining the raw material. Alternatively, the rotary kiln may optionally comprise a burner or mechanical feeder that is fed with fuel, preferably a mixture of fuels containing alternative (renewable) fuels, or 100% alternative (renewable) fuels.

The term "renewable fuel" is understood to mean fuels that originate from renewable sources or are produced from renewable resources, such as biofuels (e.g. vegetable oil, biomass, and biodiesel). This is in contrast to non-renewable fuels such as natural gas, LPG (propane), petroleum and other fossil fuels.

Preferably, the calcination step g) is carried out over a time period of 5-120 min, preferably 30-60 min.

Raw material for producing the second calcined material, such as sludges of aggregate and sand quarries, often contain iron oxide in small quantities, which may cause the resulting synthetic pozzolan to have a red color. When mixed with Portland cement to produce a composite cement, this color may be undesired, mainly for aesthetic reasons. The red coloring is due to the presence of iron(III) in the second calcined material. In order to prevent the second calcined material to obtain a red color, the rotary kiln and/or the dryer is preferably operated in a reducing atmosphere that transforms iron(III) into iron(II).

According to a further aspect, the invention provides a system comprising a first production line for producing a first calcined material, which is clinker, and a second production line for producing a second calcined material, wherein the first production line comprises:
   a) a preheater for preheating raw meal in counter current flow to hot exhaust gases coming from a clinker furnace,
   b) optionally a pre-calciner for pre-calcining the preheated raw meal,
   c) a clinker furnace for calcining the preheated and optionally pre-calcined raw meal in counter current flow to combustion gases of a clinker furnace burner to obtain cement clinker,
   d) a clinker cooler for cooling the cement clinker,
wherein the second production line comprises:
   e) optionally a dryer for drying a raw material,
   f) optionally a crusher for crushing the optionally dried raw material,
   g) a rotary kiln for calcining the optionally dried and optionally crushed raw material to obtain the second calcined material, h) optionally a cooler for cooling the second calcined material,
wherein the first production line and the second production line are connected by a first heat exchanging pipe for feeding the sensible heat of a hot gas from the first production line to the rotary kiln as a heat source for calcining the raw material, and
wherein the first production line and the second production line are connected by a second pipe for introducing a rotary kiln exhaust gas coming from the rotary kiln into the first production line for the secondary combustion of the rotary kiln exhaust gas.

Preferably, the first heat exchanging pipe is in fluid communication with a clinker cooler of the first production line to feed a clinker cooler off-gas from the clinker cooler as said heat source into the rotary kiln of the second production line.

Preferably, the second pipe is in fluid communication with the pre-calciner or the preheater of the first production line for introducing the rotary kiln exhaust gas into the pre-calciner or the preheater, respectively.

Preferably, the first production line and the second production line are connected by a third heat exchanging pipe for feeding the sensible heat of a hot gas from the first production line to the dryer as a heat source for drying the raw material.

Preferably, the dryer and the cooler of the second production line are connected with each other in a heat exchanging manner so that the sensible heat drawn from the second calcined material in the cooler is used as a heat source for drying the raw material in the dryer.

Preferably, the dryer and the cooler of the second production line are connected with each other in a heat exchanging manner so that the loss of sensible heat to the raw material in the dryer is used as a cooling source for cooling the second calcined material in the cooler.

Preferably, the dryer is designed as a drying screw, comprising a screw conveyor for conveying the raw material and a heat exchanger surface for transferring heat from a heat exchanger fluid to the raw material while being conveyed, wherein the heat exchanger surface preferably comprises an annular surface surrounding the screw conveyor and/or a surface of the conveying screw of the screw conveyor.

Preferably, the rotary kiln comprises a burner or a conveyor for introducing fuel into the rotary kiln.

Preferably, the cooler is designed as a cooling screw, comprising a screw conveyor for conveying the second calcined material and a heat exchanger surface for transferring heat from the second calcined material to a heat exchanger fluid, wherein the heat exchanger surface preferably comprises an annular surface surrounding the screw conveyor and/or a surface of the conveying screw of the screw conveyor.

The invention will now be described in more detail with reference to an illustrative embodiment shown in FIG. 1. FIG. 1 schematically illustrates a first production line 1 and a second production line 2. The first production line 1 is a clinker production line and comprises a preheater 3, to which a raw meal 4 is fed in order to preheat the raw meal 4 in counter current flow to hot exhaust gases coming from a clinker furnace 6. The hot exhaust gases are discharged through the stack 20. After passing through the preheater 3, the raw meal is fed into a pre-calciner 5, in which the preheated raw meal is pre-calcined. The pre-calcined raw meal is fed into the clinker furnace 6, where the raw meal is calcined in counter current flow to combustion gases of a clinker furnace burner 7 to obtain cement clinker. The cement clinker withdrawn at the downstream end of the clinker furnace 6 is introduced into a clinker cooler 8 and the final clinker product is stored in a silo 9. A first partial amount of the off-gas from the clinker cooler 8 is used as combustion gas in the clinker furnace 6 and a second partial amount of said off-gas is used as tertiary air, which is fed to the pre-calciner 5 via a tertiary air duct 10.

The second production line 2 comprises a dryer 11, in particular a drying screw, to which raw material 12, such as sludges resulting from the washing of sand or aggregates, is fed, in order to remove water from said raw material. The dried raw material is fed into a rotary kiln 13, where it is calcined at a temperature of 400-1.000° C. The calcined material, such as calcined clay is withdrawn at the downstream end of the rotary kiln 13 and is introduced into a cooler 14 and the final calcined material is stored in a silo 15.

In order to provide the thermal energy to the rotary kiln 13 that is required for the calcination process, a partial amount of the off-gas from the clinker cooler 8 or from other suitable heat sources from the first production line is fed to the rotary kiln 13 via a pipe 16.

Further, the exhaust gas from the rotary kiln 13 is introduced into the pre-calciner 5 of the first production line 1 via a pipe 17 for the secondary combustion of the rotary kiln exhaust gas.

Further, the cooler 14 and the dryer 11 are connected with each other by tubings 18 and 19, in order to establish a closed loop for exchanging heat between said components via a heat exchanging fluid that circulates in said tubings 18 and 19.

To sum up, the invention results in the following advantages.

Increasing the energy efficiency in the thermal treatment of raw materials to obtain a material having pozzolanic and/or latent hydraulic properties.

Replacement of scarce materials required for the production of composite cement (i.e. limestone, fly ash, granulated blast furnace slags).

The thermal treatment of raw materials for the production of a material having pozzolanic and/or latent hydraulic properties can be performed with 100% alternative or renewable fuels.

Ecologically friendly recycling of contaminated wastes.

Production of a material having pozzolanic and/or latent hydraulic properties suitable for the utilization in composite cements with a maximum feed of contaminated material streams.

Replacement of energy intense clinker resulting in ecological and economic benefits.

Lower $CO_2$ footprint compared to conventional methods (e.g. flash calcination).

Reduced investment and operating costs compared to a flash calciner.

The invention claimed is:

1. A method of producing a first calcined material, which is cement clinker, and a second calcined material, wherein the cement clinker is produced in a first production line that comprises: a preheater for preheating raw meal in counter current flow to hot exhaust gases coming from a clinker furnace, optionally a pre-calciner for pre-calcining the preheated raw meal, a clinker furnace for calcining the preheated and optionally pre-calcined raw meal in counter current flow to combustion gases of a clinker furnace burner to obtain cement clinker, and a clinker cooler for cooling the cement clinker, the cement clinker being produced in the first production line by carrying out the following steps:

a) preheating raw meal in the preheater in counter current flow to hot exhaust gases coming from the clinker furnace, b) optionally pre-calcining the preheated raw meal in the pre-calciner, c) calcining the preheated and optionally pre-calcined raw meal in the clinker furnace in counter current flow to combustion gases of the clinker furnace burner to obtain cement clinker, d) cooling the cement clinker in the clinker cooler, wherein the second calcined material is produced from a raw material in a second production line that comprises a dryer for drying a raw material, optionally a crusher for crushing the dried raw material, a rotary kiln for calcining the dried and optionally crushed raw material to obtain the second calcined material, optionally a cooler for cooling the second calcined material, the second calcined material being produced from the raw material in the second production line by carrying out the following steps:

e) drying a raw material in the dryer, f) optionally crushing the dried raw material in the crusher, g) calcining the dried and optionally crushed raw material in the rotary kiln to obtain the second calcined material, h) optionally cooling the second calcined material in the cooler, wherein the first production line and the second production line are connected by a first heat exchanging pipe for feeding a sensible heat of a hot gas from the first production line to the rotary kiln as a heat source for calcining the raw material, and wherein the first production line and the second production line are connected by a second pipe for introducing a rotary kiln exhaust gas coming from the rotary kiln into the first production line for the secondary combustion of the rotary kiln exhaust gas, wherein the first production line and the second production line are connected by a third heat exchanging pipe for feeding the sensible heat of a hot gas from the first production line to the dryer as a heat source for drying the raw material, wherein a sensible heat of a hot gas in the first production line is used as a heat source in the calcining step g) for calcining the raw material, and wherein the rotary kiln exhaust gas coming from the calcining step g) is introduced into the first production line for the secondary combustion of the rotary kiln exhaust gas.

2. The method according to claim 1, wherein a clinker cooler off-gas from the clinker cooler is used as said heat source in the calcining step g).

3. The method according to claim 1, wherein the rotary kiln exhaust gas is introduced into the pre-calciner or the preheater of the first production line.

4. The method according to claim 1, wherein the raw material is selected from sludges resulting from washing of sand or aggregates, asphalt, waste gypsum, contaminated earth, wet fly ash, other waste or demolition materials, road cleaning sludges, filter cakes from treatment processes of soil and waste washing, and combinations thereof.

5. The method according to claim 1, wherein the raw material is dried in said drying step e) for reducing the amount of free water to <20 wt-%.

6. The method according to claim 1, wherein the sensible heat of a hot gas in the first production line is used as a heat source in the drying step e) for drying the raw material.

7. The method according to claim 1, wherein the dryer and the cooler of the second production line are operated in a heat exchanging relationship so that the sensible heat drawn from the second calcined material during the cooling step h) is used as a heat source for drying the raw material in the drying step e).

8. The method according to claim 1, wherein the dryer and the cooler of the second production line are operated in a heat exchanging relationship so that the a loss of sensible heat to the raw material during the drying step e) is used as a cooling source for cooling the second calcined material in the cooling step h).

9. The method according to claim 1, wherein a drying screw is used for drying the raw material in the drying step e).

10. The method according to claim 1, wherein fuel is burnt in a burner of the rotary kiln for calcining the raw material in step g).

11. A system comprising a first production line for producing a first calcined material, which is clinker, and a second production line for producing a second calcined material, wherein the first production line comprises:

a) a preheater for preheating raw meal in counter current flow to hot exhaust gases coming from a clinker furnace, b) optionally a pre-calciner for pre-calcining the pre-heated raw meal, c) a clinker furnace for calcining the preheated and optionally pre-calcined raw meal in counter current flow to combustion gases of a clinker furnace burner to obtain cement clinker, d) a clinker cooler for cooling the cement clinker, wherein the second production line comprises:

e) a dryer for drying a raw material, f) optionally a crusher for crushing the dried raw material, g) a rotary kiln for calcining the dried and optionally crushed raw material to obtain the second calcined material, h) optionally a cooler for cooling the second calcined material, wherein the first production line and the second production line are connected by a first heat exchanging pipe for feeding a sensible heat of a hot gas from the first production line to the rotary kiln as a heat source for calcining the raw material, and wherein the first production line and the second production line are connected by a second pipe for introducing a rotary kiln exhaust gas coming from the rotary kiln into the first production line for the secondary combustion of the rotary kiln exhaust gas, wherein the first production line and the second production line are connected by a third heat exchanging pipe for feeding the sensible heat of a hot gas from the first production line to the dryer as a heat source for drying the raw material.

12. The system according to claim 11, wherein the first heat exchanging pipe is in fluid communication with a clinker cooler of the first production line to feed a clinker cooler off-gas from the clinker cooler as said heat source into the rotary kiln of the second production line.

13. The system according to claim 11, wherein the second pipe is in fluid communication with the pre-calciner or the preheater of the first production line for introducing the rotary kiln exhaust gas into the pre-calciner or the preheater, respectively.

14. The system according to claim 11, wherein the dryer and the cooler of the second production line are connected with each other in a heat exchanging manner so that the sensible heat drawn from the second calcined material in the cooler is used as a heat source for drying the raw material in the dryer.

15. The system according to claim 11, wherein the dryer and the cooler of the second production line are connected with each other in a heat exchanging manner so that a loss of sensible heat to the raw material in the dryer is used as a cooling source for cooling the second calcined material in the cooler.

16. The system according to claim 11, wherein the dryer is designed as a drying screw, comprising a screw conveyor for conveying the raw material and a heat exchanger surface for transferring heat from a heat exchanger fluid to the raw material while being conveyed.

17. The system according to claim 11, wherein the rotary kiln comprises a burner.

18. The system according to claim 11, wherein the cooler is designed as a cooling screw, comprising a screw conveyor for conveying the second calcined material and a heat exchanger surface for transferring heat from the second calcined material to a heat exchanger fluid.

19. The method according to claim 1, wherein the second calcined material is a material having pozzolanic and/or latent hydraulic properties.

\*    \*    \*    \*    \*